US006343292B1

(12) United States Patent
Roach et al.

(10) Patent No.: US 6,343,292 B1
(45) Date of Patent: Jan. 29, 2002

(54) SYSTEM AND METHOD FOR PROVIDING TEXT DESCRIPTIONS TO ELECTRONIC DATABASES

(75) Inventors: Adam Roach, Dallas; Paul Tidwell, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/146,419

(22) Filed: Sep. 3, 1998

(51) Int. Cl.[7] .............................................. G06F 17/00
(52) U.S. Cl. ........................ 707/101; 707/102; 707/104
(58) Field of Search ..................... 379/67, 201; 707/10, 707/103, 101, 102, 104; 395/200.61; 709/302

(56) References Cited

U.S. PATENT DOCUMENTS

| 5,504,906 A | * | 4/1996 | Lutoff ......................... 709/302 |
| 5,570,412 A | * | 10/1996 | LeBlanc ...................... 379/58 |
| 5,724,406 A | | 3/1998 | Juster ........................... 379/67 |
| 5,734,882 A | * | 3/1998 | Lopresti et al. .............. 707/101 |
| 5,764,977 A | * | 6/1998 | Oulid-Aissa et al. ......... 707/10 |
| 5,864,862 A | * | 1/1999 | Kriens et al. ................ 707/103 |
| 5,913,038 A | * | 6/1999 | Griffiths ................ 395/200.61 |
| 5,924,077 A | * | 7/1999 | Beach et al. .................. 705/10 |
| 6,041,325 A | * | 3/2000 | Shah et al. .................... 707/10 |
| 6,052,455 A | * | 4/2000 | James ........................ 379/201 |

FOREIGN PATENT DOCUMENTS

WO    WO 94/05111    3/1994

OTHER PUBLICATIONS

Woo Yoon et al., "Service Creation for Customer using SCE: Customized Service Description in Intelligent network Services", IEEE, 1996, pp. 146–149.*

Carvalho et al., "Service Creation Environment for IN CS1", IEEE, 1994, vol. 1, pp. 399–413.*

Lane, "An Entity–based Service Script editor for IN", IEEE, 1992, pp. 57–61.*

Steffen, et al.,Hierarchical Service Definition, 1997 Annual Review of Communications, pp. 847–856.

Morris, et al., An SDL Based Realisation of an IN Service Development Environment, University of Limerick, Oct. 16, 1995, pp. 292–308.

Dr. Bernard S. Ku, A Reuse–Driven Approach for Rapid Telephone Service Creation, 1994 IEEE, pp. 64–72.

Wennerberg, et al, An Advanced Service Creation Environment Using SIBs, 1993–94 Annual Review of Communications, pp. 454–459.

* cited by examiner

Primary Examiner—Wayne Amsbury
Assistant Examiner—Thuy Pardo
(74) Attorney, Agent, or Firm—Jenkens & Gilchrist, P.C.

(57) ABSTRACT

A development tool for creating telecommunication subscriber services or other operations. The tool reads a subscriber service logic diagram containing function primitives which define the service and creates data structures containing text descriptions of primitive operation and parameters pertaining thereto. The tool then examines the data structures and determines the appropriate text descriptions for the function primitives and corresponding parameters, based upon parameter values assigned by a user in creating the subscriber service logic diagram. The tool also validates parameters against available constraints. The text descriptions are then ported into the subscriber service logic diagram, thereby clarifying the operation of the subscriber service defined by the logic diagram.

23 Claims, 7 Drawing Sheets

| Depends On: | None | — 31 |
| --- | --- | --- |
| Func. Desc: | Add %P1 to %P2 | — 32 |
| Node Desc: | | — 33 |
| Param. Range 1: | 0..255 | — 35 |
| Param. Name 1: | First Value | — 34 |
| Param. Range 2: | 0..255 | — 35 |
| Param. Name 2: | Second Value | — 34 |
| No Match: | | — 36 |
| Match: | | — 37 |

FIG. 4

| Depends On: | None | — 31 |
| --- | --- | --- |
| Func. Desc: | Subtract %P3 from %P2 | — 32 |
| Node Desc: | Subtract | — 33 |
| Param. Range 1: | 0..3 | — 35 |
| Param. Name 1: | Mode | — 34 |
| Param. Range 2: | 0..255 | — 35 |
| Param. Name 2: | First Value | — 34 |
| Param. Range 3: | 0..255 | — 35 |
| Param. Name 3: | Subtracter | — 34 |
| No Match: | | — 36 |
| Match: | | |

```
Node * Node::getDescription(int *parameters)
{
  Node *retNode = new Node ();
  Node *tmpNode = NULL;
  int i;

if ('depends on' field matches appropriate parameter)
  {
    retNode->merge(this);
    for (i=0 to number of non-null 'match' pointers)
    {
      tmpNode = match[i]->getDescription (parameters);
      retNode->merge (tmpNode);
      delete tmpNode;
    }
  }
  else if ('no match' pointer is non-null)
  {
    tmpNode = noMatch->getDescription (parameters);
    retNode->merge (tmpNode);
    delete tmpNode;
  }
  return retNode;
}
```

*FIG. 8*

FIG. 9 and illustrated in FIG. 1 provides little information as to the
SYSTEM AND METHOD FOR PROVIDING TEXT DESCRIPTIONS TO ELECTRONIC DATABASES

BACKGROUND OF THE INVENTION

1. Technical Field of the Invention

The present invention relates to a computer-based user interface, and particularly to a system and method for providing text descriptions and validated parameters to electronic databases having parameter-dependent functions. One aspect of the present invention is directed to a user interface for the development of telecommunication subscriber services.

2. Background and Objects of the Invention

In the Intelligent Network (IN) and the Advanced Intelligent Network (ANI), telephone services are created and controlled using intelligent workstations having user-friendly software. Such telecommunication networks typically include graphical user interfaces which enable telephone service representatives to create new subscriber services and/or customize existing services substantially immediately without the telephone representative having to partake in extensive software programming or editing of cryptic text files as required by the more traditional method of creating telecommunication services.

The graphical user interface for subscriber telecommunication services may typically allow a telephone service representative to develop or modify a subscriber service in part by accessing a library of service independent building blocks. Each service independent building block (SIB) is a software primitive which performs a single unique function and is represented within the user interface as an icon. When a SIB is selected from the SIB library, a telephone service representative is able to alter service-related parameters associated with its particular operation, in order to conform the function of the SIB to the requested subscriber service. The complete description and operation of each SIB is maintained in a single text file.

Figure 2:
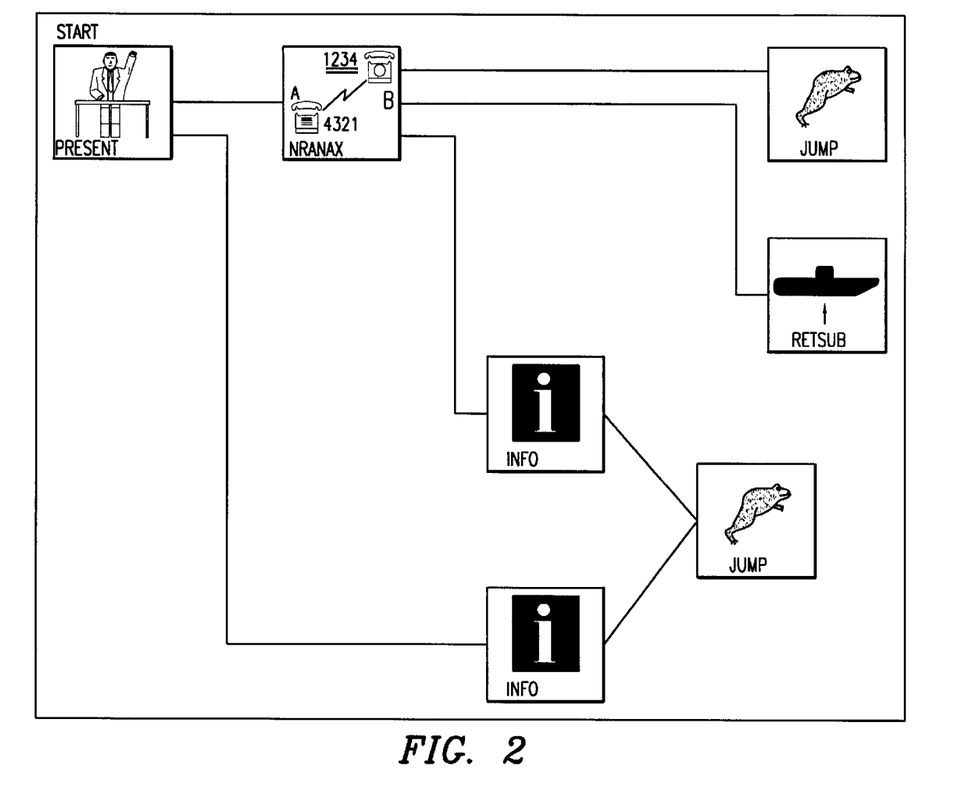
FIG. 2 is a diagram of an exemplary layout of a subscriber service created by an existing subscriber service development tool.

Further, the user interface may allow a telephone service representative to define and interrelate a number of SIBs in creating more complex subscriber services. In one IN, this is accomplished by placing a number of selected SIB icons and interconnecting the SIB icons with line segments. An exemplary layout or service logic diagram created in developing a subscriber service is illustrated in FIG. 2. Once the diagram for the subscriber service to be created is complete and the desired parameters and text are incorporated into the selected SIBs, a text file of the service layout is automatically created.

One problem with subscriber service development tools of this kind is that the service logic diagram described above and illustrated in FIG. 1 provides little information as to the operation performed. SIB data from the SIB library text file is very cryptic and thus cannot be easily ported into the service diagram in order to better describe the operation of the created service. Because the description of the behavior of a SIB primitive may also vary depending upon the value of a parameter assigned by a user during the creation of the service logic diagram, only a portion of a SIB description from the text file should be included into the logic diagram. Further, user-assigned parameter values for a SIB may not fit within acceptable ranges for the SIB in order to properly function. As a result, there exists a need for a service application development tool from which created service logic diagrams are quickly and easily understood and verified.

It is an object of the present invention to provide a user interface which provides human-readable descriptions of parameter-dependent functional primitives to an electronic database defining an operation, such as a database defining a particular telecommunication subscriber service.

Another object of the present invention is to provide a development tool that provides complete human-readable descriptions and restrictions for each parameter pertaining to a functional primitive used in defining an operation, such as a SIB primitive used in defining a telecommunication subscriber service.

It is another object of the invention to provide a service development tool which provides validation ranges for parameters utilized in performing a subscriber service or other operation.

SUMMARY OF THE INVENTION

The present invention overcomes the shortcomings in existing service development tools and satisfies a significant need for a user friendly service development tool which more precisely informs the user of the operation of user-created subscriber services.

According to a first embodiment of the present invention, there is provided a service development tool including a set or library of service function primitives and a user interface for creating logic diagrams representing various telephone-related subscriber services using the function primitives. The development tool parses each function primitive employed in the created service logic diagram into a data structure having parameter and operational description information. The data structure for each function primitive is an acyclic set of one or more nodes, each of which contains data fields having text descriptions of the behavior of the function, parameters employed by the function and valid ranges for the parameters employed by the function, and pointers to other node or nodes to which the particular node is related.

Once the data structure for each primitive in a subscriber service logic diagram is created, the service development tool, according to the present invention, then determines the appropriate text descriptions for each selected function primitive. Specifically, for each SIB primitive in the subscriber service logic diagram the tool creates a working node therefor having the same fields as the data fields in the nodes corresponding to the SIB primitive. The tool then sequentially reviews each node in the data structure and suitably updates the parameter description, parameter restriction, and behavioral description fields in the working node based upon the data in the reviewed node and based upon the parameter value(s) assigned by the user to the SIB primitive when creating the service logic diagram. When every node for the SIB primitive is reviewed and the working node fields appropriately updated, the working node contains complete text descriptions for the parameters and operational behavior of the SIB primitive. Following the completion of a working node for each SIB function employed in the subscriber service logic diagram, data in the working nodes may be ported into the subscriber service diagram or associated text file in order to better clarify the operation of the subscriber service to users of the service development tool.

The present invention may be employed in applications which define operations other than telecommunication subscriber services. The present invention may be utilized to provide text descriptions and/or validated parameter values for virtually any electronic database having parameter-dependent functions. For instance, the present invention may be utilized in conjunction with a microprocessor instruction set to provide text descriptions as comments to assembly language code.

DETAILED DESCRIPTION OF THE PREFERRED EXEMPLARY EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
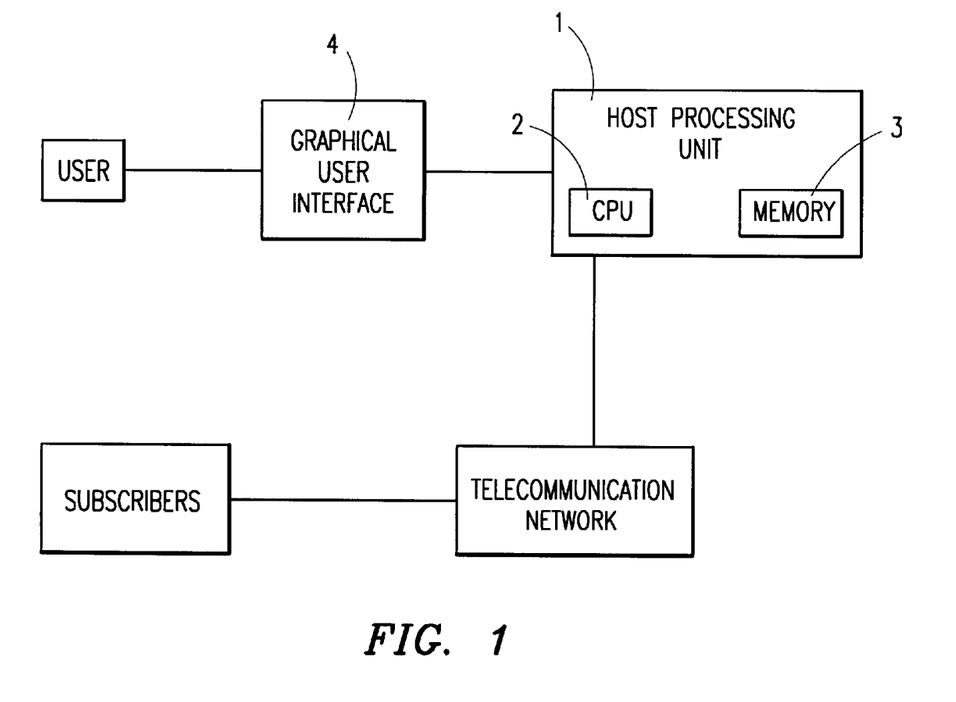
FIG. 1 is a diagram of a subscriber service development tool in conjunction with a telecommunication system according to a preferred embodiment of the present invention.

Referring to FIG. 1, there is shown a function block diagram of a subscriber service development tool and associated telecommunication system. Host processing unit 1 is manipulated by the system user to create telecommunication services for subscribers. Host processing unit 1 generally includes a central processing unit 2 and memory 3 for storing software and data pertaining to the present service development tool. A graphical user interface (GUI) 4 preferably provides, among other things, access to data in memory 3 relating to SIB primitives which a user may employ to create a subscriber service without the user having special knowledge of the operating system of host processing unit 1 or of computer program techniques.

Specifically, upon receiving a request for creating a new service for a subscriber or modifying an existing subscriber service, a user, by employing GUI 4, is presented a template on which a graphical representation of the subscriber service, such as a logic diagram, may be described. The service development tool may provide to the user a library of existing SIB primitives, each of which performs a single, unique function. The user may select and place one or more SIB icons on the template, modify parameters pertaining to the icons, and interrelate the icons by creating line segments therebetween. By creating a service logic diagram in this way, the user is capable of fully describing the operation of the desired subscriber service without writing a single line of program code. An illustration of a logic diagram for an exemplary subscriber service is shown in FIG. 2.

As mentioned hereinabove, one problem associated with the service development tool is that a logic diagram for a subscriber service ofttimes displays an insufficient amount of information about the operation of the created subscriber service, and particularly about each individual SIB employed in the logic diagram. Consequently, this absence of information in the logic diagram may understandably confuse not only the creator of the subscriber service logic diagram as to the actual operation thereof, but also other users who may later need to modify or otherwise access the service logic diagram.

The subscriber service development tool, in accordance with the present invention, overcomes this limitation in existing development tools by providing to a user accessing a subscriber service logic diagram plain text descriptions regarding SIB function and SIB parameters in the logic diagram itself. In addition, the present invention performs a validation check on every user-assigned parameter value for each SIB in the logic diagram against available parameter constraints, and presents the validation results to the system user. By providing functional text descriptions and validated parameter information to a user of the subscriber service development tool, the user is provided a detailed description of the subscriber service.

The present invention is largely implemented as computer program code stored in memory 3 of host processing unit 1. The present invention is adapted for use in conjunction with existing subscriber service development tools or as an integral part thereof.

The subscriber service development tool, in accordance with the present invention, preferably parses the database corresponding to the service logic diagram and creates a data structure having useful properties, and utilizes the data structure properties in determining descriptions of SIB primitives and SIB parameters for inclusion into the service logic diagram. In particular, for each SIB in the logic diagram, the present invention preferably creates a data structure as a set of one or more nodes, each of which includes a number of data field.

Figure 3:
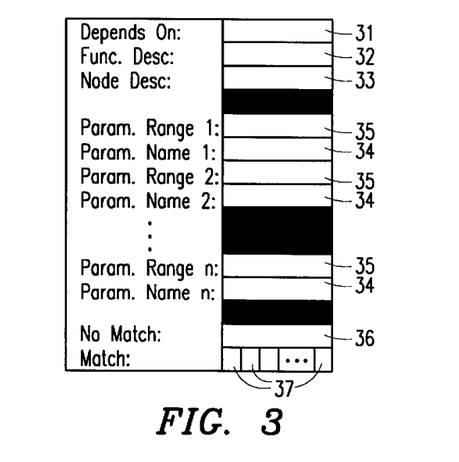
FIG. 3 is a data structure created by the subscriber service development tool according to a preferred embodiment of the present invention.

Referring to FIG. 3, there is shown a node 30 as a fundamental data structure of the present invention. Node 30 preferably includes data fields 31–37 which are adapted to describe an operation as well as parameters pertaining thereto. Node data field 31 is used to indicate if the corresponding node is to apply in providing parameter and SIB behavioral descriptions. For instance, data field 31 may define a particular parameter value. If a parameter is specified in a node and its value is the same as the value assigned by the user when creating the logic diagram, then the node is utilized in determining parameter and SIB behavioral descriptions.

Further, data field 32 describes the operation of the respective node. Data field 33 describes the way in which the parameter specified in data field 31 modifies the SIB function. Data fields 34 provide descriptions for parameters utilized in performing the operation of the SIB primitive as specified by the node. A node may include any number of data fields 34. Each data field 35 defines a range of valid values for its respective parameter defined in data field 34. Data field 36 is a pointer which identifies another node to be considered if the present node is not utilized in determining parameter and SIB behavioral descriptions. Data field 37 is an array of pointers which identify other nodes which are to be considered in determining parameter and SIB behavioral descriptions if the present node being considered is utilized in determining parameter and SIB behavioral descriptions. The number of pointers in data field 37 of a node corresponds to the number of parameters defined in the node's data fields 34.

It is understood that the above-described nodal data structure 30 is exemplary in nature, and that node 30 may include other data fields in defining the behavior of the node.

For the description type data fields, such as data field 32, a predetermined parameter sequence may be employed which, when parameter and SIB behavioral descriptions are being determined, the actual parameter and/or parameter value will be substituted therefor. For instance, if the sequence "%P1" is employed in a description type data field, the value of the parameter will replace the sequence in determining the parameter data to provide to the user. If the parameter value is a number, both the value and the parameter may replace the sequence. It is understood that other special sequences may be utilized to replace data sequences when determining parameter and SIB behavioral descriptions.

Figure 4:
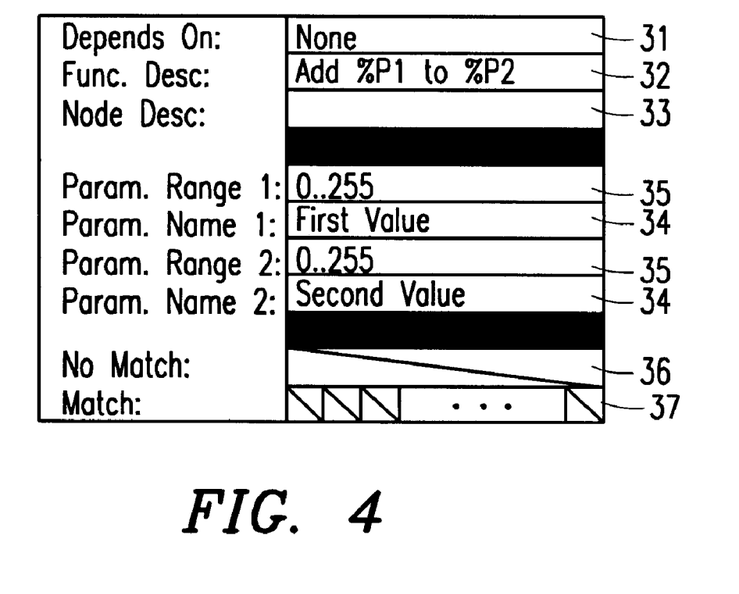
FIG. 4 is a data structure for a first exemplary function according to the present invention.

The data structure created by the present invention may be best described by way of an illustration. Referring to FIG. 4, there is described a data structure for a SIB function that performs an addition of two parameters. The data structure for this function is represented by a single node. Data field 31 of the node in FIG. 4 indicates that this node is to be considered in every instance of determining parameter and SIB behavioral descriptions. Data field 32 describes that the arithmetic operation that this node/SIB performs is an addition of two parameter values. Data fields 34 define the two parameters, and data fields 35 provide numerical ranges for their respective data fields 34. These ranges are used to validate that parameter value data which the user assigns when forming the subscriber service logic diagram falls within the desired range of values. Data fields 33, 36 and 37 are unused in this data structure for the present addition operation.

Figure 5:
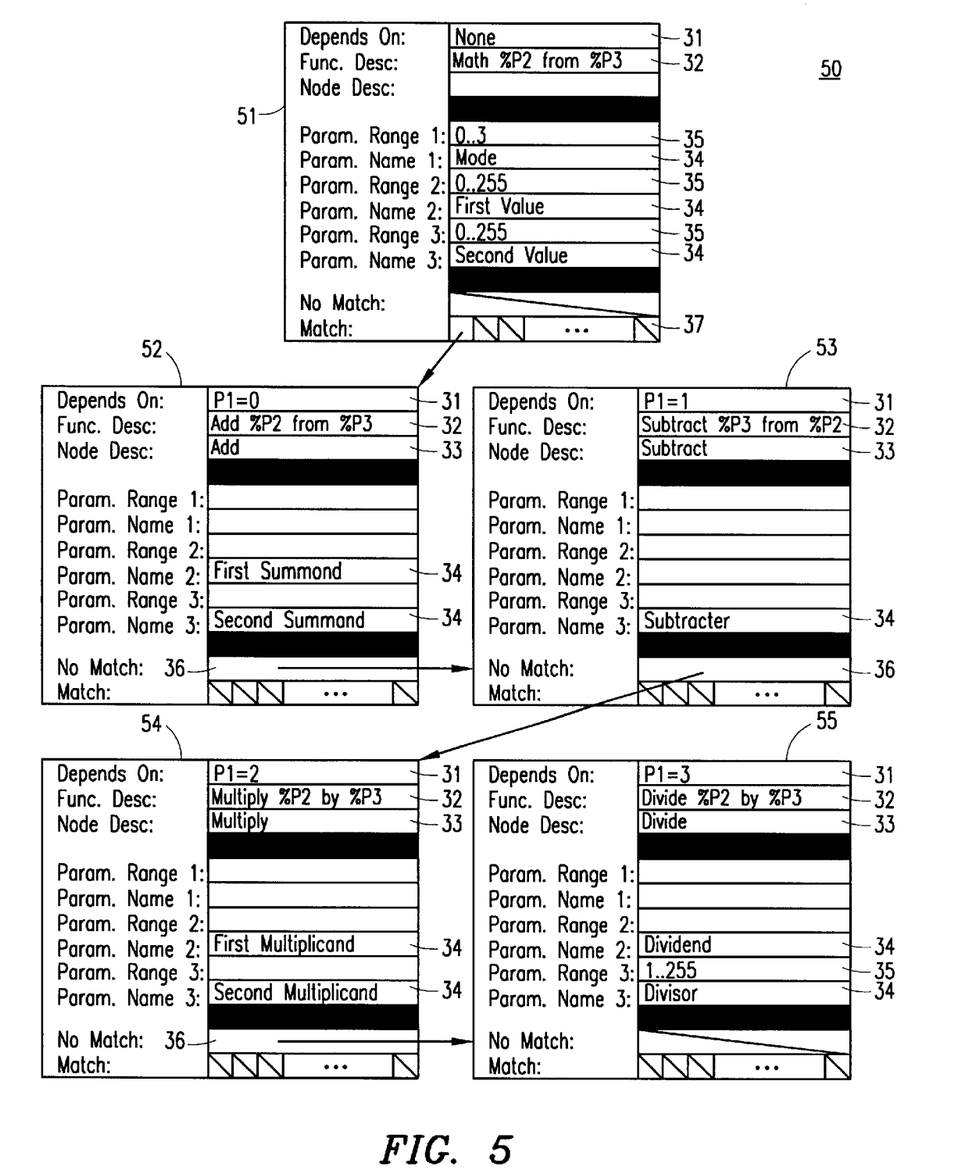
FIG. 5 is a data structure for a second exemplary function according to the present invention.

It is understood that the data structure according to the present invention may be used to define more complex SIB functions. SIB functions may be defined in which the operation and parameters of a SIB function vary depending upon the values of other parameters. By way of example, a more complex arithmetic function may be defined by the data structure according to the present invention. In the example, the value of the first parameter of the function determines whether an addition, subtraction, multiplication or division is to be performed. The second and third parameters define the operands. FIG. 5 shows the data structure 50 for this exemplary generic arithmetic function. The function is defined by a five node data structure. Node 51 is the top level or head node and as such is an independent node whose data fields will always be considered when the parameter and SIB behavioral descriptions are determined. Data field 32 of node 51 describes the general function as being an arithmetic operation involving two operands, parameters "First Value" and "Second Value" (data fields 34) whose respective ranges are specified in data fields 35 of node 51. A third parameter, parameter "Mode," is described in data field 35 as having a range between 0 and 3. Data field 37 of node 51 includes a pointer which points to node 52 for further descriptions.

Node 52 is a node which depends from node 51. Data field 31 of node 52 defines the "Mode" parameter as being equal to 0. Thus, if the user assigns the "Mode" parameter the value "0" when creating a logic diagram which employs this SIB function, the data fields of node 52 will be considered when determining the SIB parameter and SIB behavioral descriptions.

Further regarding node 52, data field 32 describes the specific operation, the addition of "First Value" and "Second Value" parameters, to be performed if "Mode" parameter is set to "0". Data fields 34 describe the two the parameters to be added as "First Summand" and "Second Summand". These parameter descriptions will replace the respective parameter descriptions of node 51 if "Mode" parameter is assigned by the user to a value of "0". Data field 36 points to node 53 for consideration in the event the "Mode" parameter value is not assigned to "0" by the user.

Node 53 is a node which depends from node 52. Data field 31 of node 53 describes the "Mode" parameter as being equal to "1". Thus, if the user assigns the "Mode" parameter the value "1" when creating a logic diagram which employs this SIB function, the data fields of node 53 will be considered when determining parameter and SIB behavioral descriptions.

In node 53, data field 32 describes the specific operation, the substraction of two parameters, to be performed if "Mode" parameter is set by the user to "1". A data field 34 describes the "Second Value" parameter as "Subtractor". Thus if "Mode" parameter is set to "1" by a user when creating the subscriber service logic diagram, data field 34 will replace the respective data field 34 description of node 51 in describing SIB functional behavior. Data field 36 points to node 54 for consideration in the event the "Mode" parameter value is not assigned to "1" by the user.

Node 54 is a node which depends from node 53. Data field 31 of node 54 describes the "Mode" parameter as being equal to "2". Thus, if the user assigns the "Mode" parameter the value "2" when creating a logic diagram which employs this SIB function, the data fields of node 52 will be considered when determining SIB parameter and SIB behavioral descriptions.

In node 54, data field 32 describes the specific node operation, the multiplication of "First Value" and "Second Value" parameters, to be performed if "Mode" parameter is set to "2". Data fields 34 define the two parameters to be added as "First Multiplicand" and "Second Multiplicand". Thus if "Mode" parameter is set to "2" by the tool user, the data fields of node 54 will replace their respective data fields of parent node 51. Data field 36 points to node 55 for consideration in the event the "Mode" parameter value is not assigned to "2" by the user.

Node 55 is a node which depends from node 54. Data field 31 of node 55 describes the "Mode" parameter as being equal to "3". Thus, if the user assigns the "Mode" parameter the value "3" when creating a logic diagram which employs this function, the data fields of node 55 will be considered when determining SIB parameter and SIB behavioral descriptions.

In node 55, data field 32 describes the specific operation, the division of "First Value" parameter by "Second Value" parameter, to be performed if "Mode" parameter is set to "3". Data field 34 defines the dividend parameter as "Dividend". Neither data field 36 nor data field 37 points to any other node.

It is noted that the only data fields defined in the dependant or leaf nodes are those which will replace the data field values defined in its parent or root node.

The steps for creating the data structure comprises the steps of reading values from reading description values from one or more databases relating to the SIB primitive library and the subscriber service logic diagram created by a user. Description values are read from the databases until a marker indicating the start of a dependency block is identified. In response to the dependency block identification, a new node is allocated for the SIB primitive whose description values are currently being read. A new node is allocated for each defined value of the parameter on which the dependency relies. The nodes for a particular SIB primitive are linked together using data fields 36 and 37. Dependent nodes may themselves refer to dependent nodes.

Once the data structure is created for each instance of the SIB functions appearing in the logic diagram for the subscriber service, the present subscriber service development tool next determines the appropriate text parameter and SIB behavioral descriptions to port to the created subscriber service logic diagram. The determinations are based upon the created data structure, and upon the user-assigned parameter values. Once the appropriate parameter and SIB behavioral descriptions are determined for each SIB instance in the logic diagram, the descriptions and constraints are ported into the logic diagram, thereby clarifying the function of each SIB function as well as the operation of the overall subscriber service.

Figure 8:
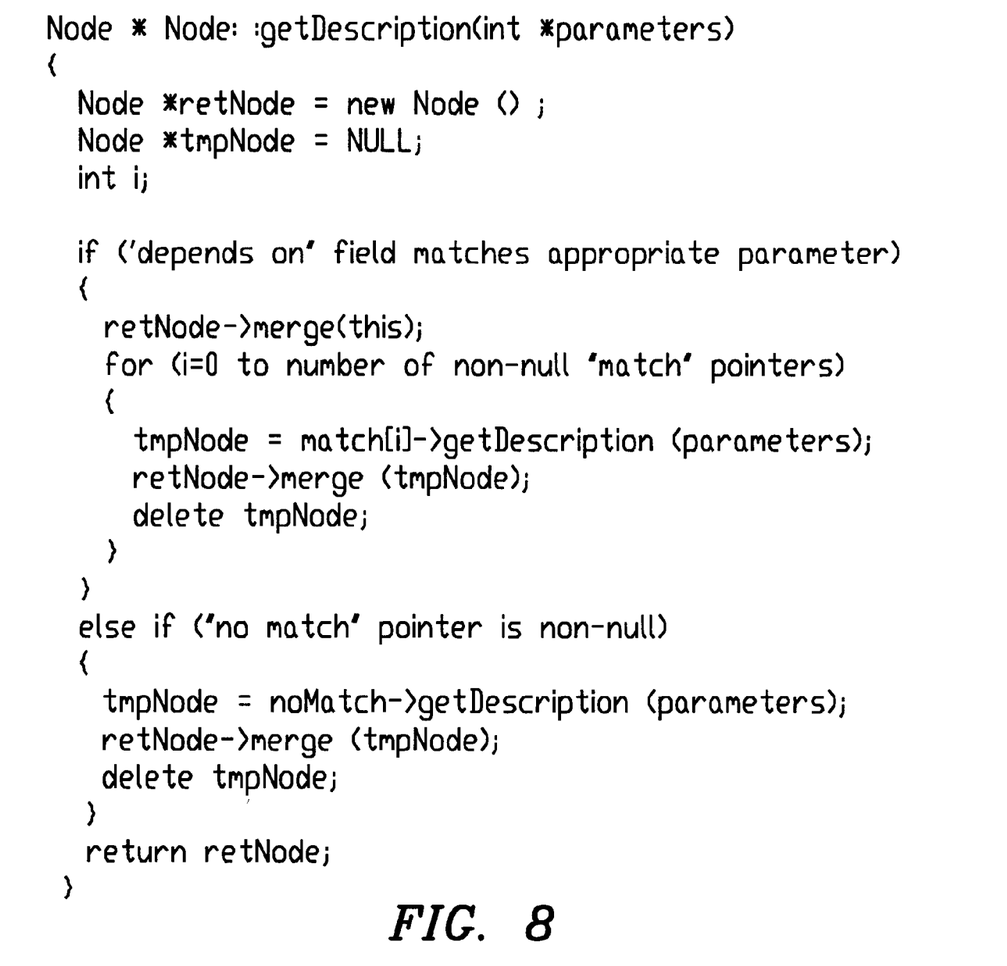
FIG. 8 is a listing of pseudocode describing the operation of the subscriber service development tool according to a preferred embodiment of the present invention.

The present invention determines the appropriate parameter and SIB behavioral descriptions for a SIB function by extracting the data fields from certain nodes thereof based upon the interrelationship of the nodes as well as the user-assigned parameter values. For each SIB function in the logic diagram, the present invention creates a node, the "return" node, having the same structure as the nodes which define the SIB function, and, starting at the top or head node, copies data fields into the return node therefrom. Next, each node pointed to by the head node is checked to see if its parameter value in data field 31 matches the corresponding user-assigned parameter value. For each node having parameters which match, all the data fields for that node overwrite their respective data fields in the return node. Those nodes whose parameter values in data field 31 do not match their corresponding user-assigned parameter values are not overwritten into the return node, and the next pointed-to node is examined. These steps are repeated recursively until all leaf nodes having matching parameter values have been examined. When all of the nodes have been examined, the return node contains the final parameter descriptions, parameter constraints and behavioral descriptions for the SIB primitive. FIG. 8 is a computer pseudocode listing concisely describing these operational steps using recursion.

The appropriate parameter and SIB behavioral descriptions for the arithmetic function described by the data structure in FIG. 5 will be determined, based upon the "Mode" parameter being assigned the value of "1" (subtraction operation) by the user when creating the subscriber service logic diagram employing the present SIB. First an empty return node is created and all defined data fields from head node 51 are copied therein, except for the pointer data fields. Because the value in data field 31 of node 51 does not provide a mismatch, by default, the node pointed to in data field 37 (node 52) is then examined. Because the parameter value in data field 31 of node 52 does not match the corresponding user-assigned parameter value, no data fields from node 52 are copied into the return node. The node pointed to in data field 36 of node 52 (node 53) is then examined.

Figure 6:
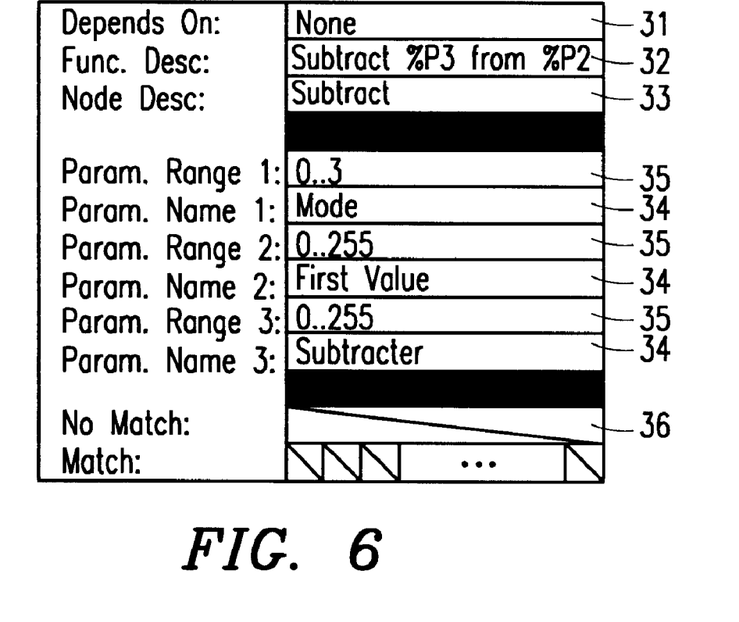
FIG. 6 is a data structure for the second exemplary function illustrated in FIG. 5.

Because the parameter value in data field 31 of node 53 matches the corresponding user-assigned parameter value ("Mode" parameter=1), the data fields of the return node are overwritten with the corresponding defined data fields of node 53. Because there is a match with respect to node 53, the nodes pointed to in data field 37 thereof are examined. Because no node is pointed-to in data field 37, however, data field 37 of the most recently examined matching node, in this case head node 51, is again examined to see if other nodes are pointed to therein. Because no unexamined nodes are pointed to in data field 37 of node 51, the examination is complete. The resulting return node, shown in FIG. 6, includes data fields containing data obtained from nodes 51 and 53. These data fields may be thereafter ported into the subscriber service logic diagram utilizing this SIB.

Figure 7:
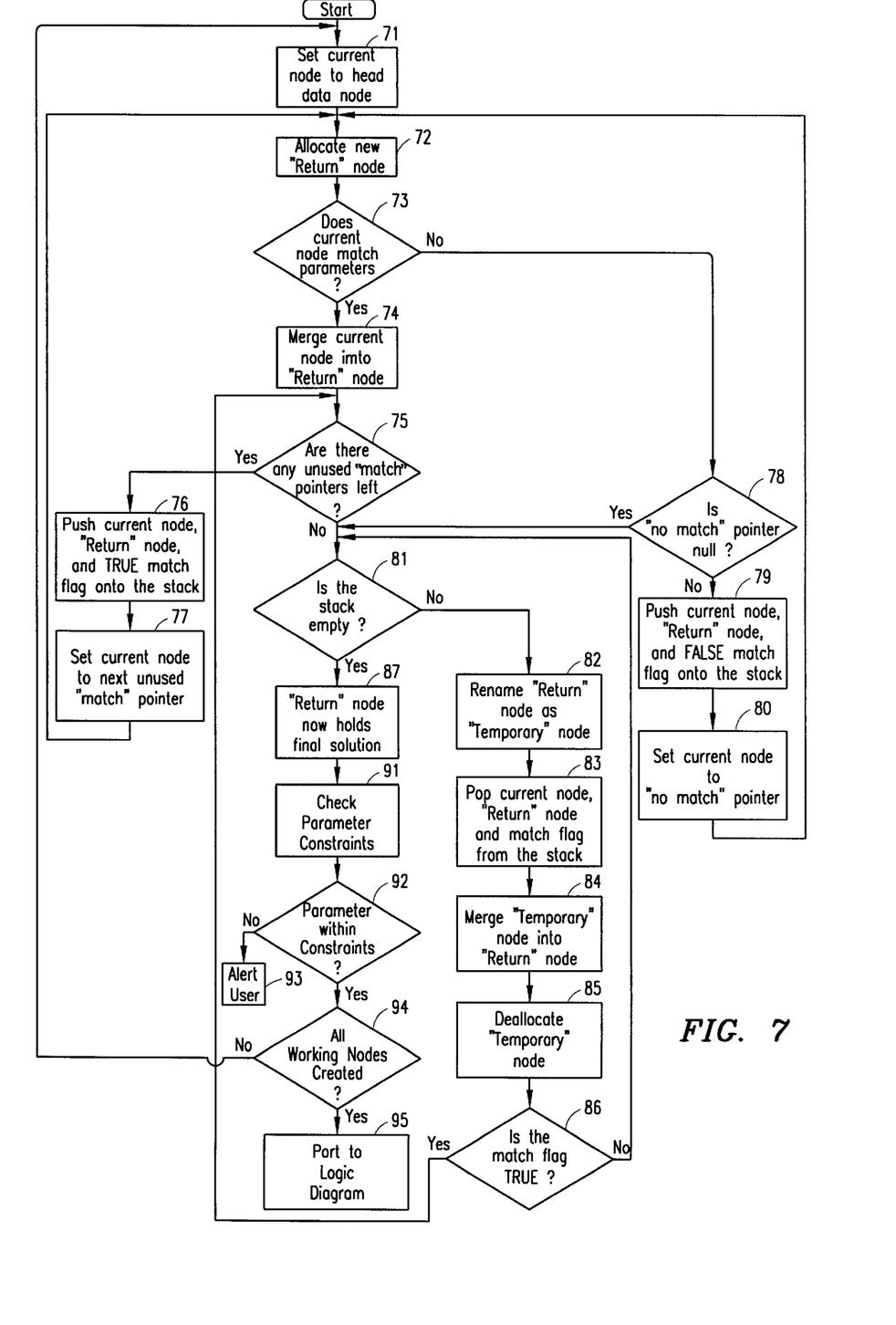
FIG. 7 is a flow chart illustrating the operational steps for a subscriber service development tool according to a preferred embodiment of the present invention.

Referring to FIG. 7, there is described the operational steps in determining the appropriate text descriptions and parameter constraints for a single SIB function. It is understood that the operation of the present invention is not limited to the specific steps described or order thereof. The operational steps described herein below are presented for exemplary reasons.

In step 71 of a preferred flow chart described in FIG. 7, the current node is set to the top or head node. Next, the return node is defined in step 72. The current node is checked in step 73 to see if the parameter value in its data field 31 matches the corresponding value assigned by the user. If there is a match, the data fields from the current node, except for the pointer fields, are copied or merged into the return node at step 74. If data field 37 of the current node points to other nodes in step 75 which have yet to be examined or used, the present invention pushes the current and return node data fields and a "true" match flag into a stack at step 76, and sets the current node to the node pointed to by the next unused pointer of data field 37. Thereafter, the present invention examines the new current node as described above in steps 72–73. Steps 72–77 are thus performed on a node if the node parameter matches its corresponding user-specified parameter value.

If the parameter in data field 31 of the current node does not match the corresponding user-specified parameter value, data fields from the current node are not merged into the return node. If data field 36 of the current node points to another node at step 78, the current node and the return node are pushed into the stack, a false match flag is set and pushed into the stack, and the current node is set to the node pointed to by data field 36. The pointed-to node is then examined as described above, starting at step 72. If data field 36 fails to point to another node, the present invention proceeds to step 81.

At step 81, the stack is checked. If the stack is not empty, a series of steps, steps 82–85, are performed which pops the stack and overwrites the popped return node with the then-existing return node data fields. If the popped information indicates that match pointers from the parent of the popped node have not been considered, those pointed-to nodes will be examined as described above. These steps are repeated until the stack is empty, with the resulting return node holding the text descriptions of the SIB parameters, SIB parameter constraints, and SIB function to be ported into the logic diagram. When all of the SIB primitives have been examined and working nodes created therefor, the working node data fields are ported into the subscriber service logic diagram.

Figure 9:
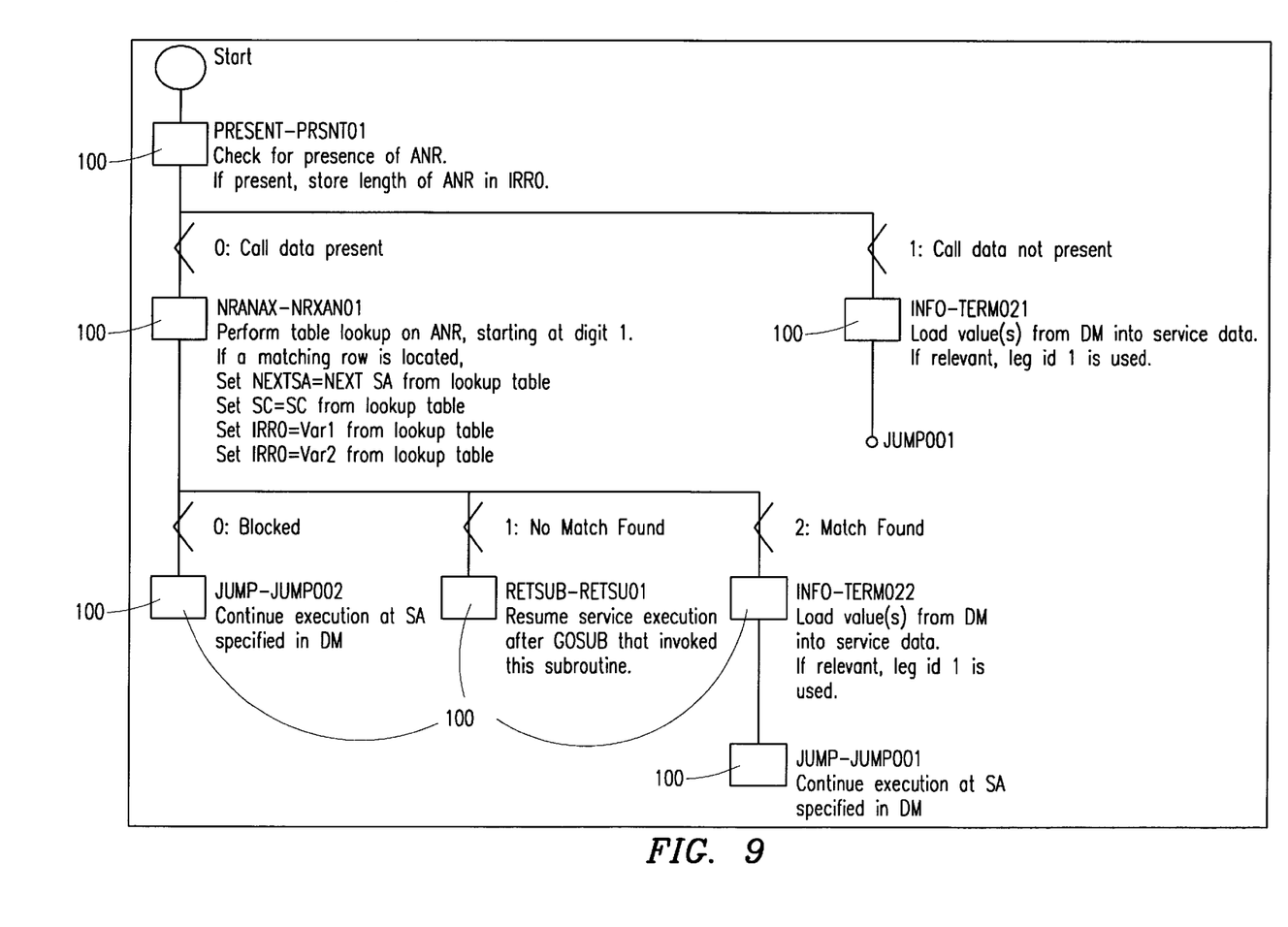
FIG. 9 is a resulting diagram of a subscriber service in accordance with a preferred embodiment of the present invention.

In addition to providing text descriptions of SIB parameters, the present invention validates the parameter values of each parameter listed in the return node against their corresponding parameter constraints appearing in the return node. If a parameter constraint appears in the return node and the value of the corresponding parameter does not satisfy the constraint, the validation fails and the user is alerted. These validation steps are illustrated as steps 91–92 in FIG. 7. Once the parameter validation is complete, the data fields in the return nodes for each SIB primitive are ported to the logic diagram database, in step 95. The resulting diagram for an exemplary subscriber service is shown in FIG. 9, with text descriptions of SIB functions, SIB parameters and SIB parameter constraints appearing adjacent their corresponding SIB icons 100.

It is understood that the present invention may be run in real time in which the determined text descriptions of SIB parameters, SIB parameter constraints and SIB operation are ported into the subscriber service logic diagram while the user is creating the diagram. Alternatively, the present invention may be run following the completion of the subscriber service logic diagram so that the determined text descriptions are ported into the completed logic diagram database for viewing by the user at a later date.

The present invention is described hereinabove in conjunction with a user interface for a telecommunication subscriber service creation tool for exemplary purposes only. A particular advantage of the present invention is that it may be utilized to provide text, such as text descriptions, to virtually any electronic database defining an operation or service having functional primitives therein whose behavior is dependent upon one or more parameters, such as parameters specified by a user of the electronic database.

By way of one example, the present invention may be employed to add text descriptions as comments to assembly language code. In this case, a computer programmer creates assembly language code that defines a computer-related operation for use with a particular microprocessor or microprocessor family. The present invention then parses each line of code and creates a data structure for each opcode used as a set of one or more nodes, each having a structure similar to the nodal structure described above with respect to the telecommunication services. Each opcode in a microprocessor's instruction set can be seen as a primitive that performs a single unique computer-related function, much in the same way a SIB performs a single function relating to a telecommunication service or operation. Following the creation of the data structure, textual comments are determined based upon bitstring values in the opcode and subsequently provided to the corresponding line in the assembly language code as an opcode descriptor.

More specifically, opcodes in opcode instruction sets for some microprocessors, such as the Motorola 680×0 family of processors, are organized such that the certain groups of bits in the opcode specify opcode families, specific opcodes within the family, and the particular behavior of specific opcodes. Each node created for an opcode would include a text description describing the particular function performed and parameter(s) relating thereto. Opcode parameters in this case may comprise bitfields in the opcode. Thereafter, the present invention can determine the correct description for each opcode function and corresponding bitfield based upon the bitfields in the assembly code and port such descriptions into the assembly language code.

The present invention may be used to validate the opcode bitfields for each opcode in the assembly language code in order to verify that there are no invalid sequences of bits in an opcode.

Although the preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A development system for creating an electronic database defining an operation, comprising:

a means for defining a subscriber service diagram of an operation as a representation of interrelated primitives, each said primitive performing a single function and having a plurality of parameters which define a behavior of said function, the value of at least one said parameter being user-assignable, and text descriptions defining said parameters and said function;

a means for creating a data structure of each primitive utilized in said subscriber service diagram of said operation, each said data structure comprising a set of one or more nodes, with each node including data fields containing a description of a function of said primitive and a description of a parameter thereof;

a means for examining said data structures for said primitives and for determining text descriptions of said parameters and said functions of said primitives based upon said primitive parameter values assignable by the user;

a means for providing said determined text descriptions of said parameters and said functions for said primitives into the subscriber service diagram of the operation; and a means for validating a parameter value corresponding to said determined parameter constraint against said determined parameter constraint.

2. The development system of claim 1, wherein:

said data structure for at least one primitive includes a plurality of text descriptions for said parameter and a plurality of text descriptions for said function, and said examining and determining means selects a text description of said parameter and a text description of said function based upon said parameter value assignable by the user for said primitive.

3. The development system of claim 1, wherein:

said data structure for at least one primitive comprises a set of a plurality of nodes, each of said nodes including data fields containing a description of said function, a description of a parameter, and links to other of said nodes in said set of nodes for said primitive.

4. The development system of claim 3, wherein:

said data field of said node which links said node to another node in said set of nodes for said primitive includes a data field specifying a value of said parameter whose value is user-assignable, and a data field containing a pointer to said another node for examining by said examining means if said user-assignable parameter value does not match said specified parameter value in said node having said pointer.

5. The development system of claim 3, wherein:

said data field of said node which links said node to another node in said set of nodes for said primitive includes a data field specifying a value of said parameter whose value is user-assignable, and a data field containing a pointer to said another node for examining by said examining means if said user-assigned parameter value matches said specified parameter value in said node having said pointer.

6. The development of claim 1, wherein:

said examining and determining means comprises a means for creating a working node for each primitive, each said working node having an identical structure to nodes corresponding to said primitive, a means for examining each node in said set of nodes for each primitive and for writing data into data fields in said working node based upon said parameter value assignable to said parameter by the user.

7. The development system of claim 6, wherein:

said data structure for at least one first primitive includes a set of a plurality of nodes, each of said nodes in said data structure including data fields containing a description of said function, a description of a parameter and a condition for said parameter whose value is user-assignable for said first primitive; and said data writing means writes data from data fields of a node corresponding to said first primitive into said working node therefor based upon an affirmative determination that said parameter value assignable by the user matches said condition in said node.

8. The development system of claim 6, wherein:

said data fields in said working nodes for said primitives contain said determined text descriptions of said parameters and said functions for said corresponding primitives following said examining and said determining of said data structure of said primitives; and said providing means comprises a means for porting said data fields of said working nodes into said subscriber service diagram.

9. The development system of claim 1, wherein:

one or more nodes of said data structure for at least one primitive includes a data field containing a constraint for a parameter of said at least one primitive.

10. The development system of claim 9, wherein:

said determining means includes a means for determining said parameter constraint for said at least one primitive based upon said parameter value specified by the user; and said providing means provides said determined parameter constraint to a user of said system.

11. A method of creating an electronic database defining an operation, comprising the steps of:

receiving a user-created subscriber service diagram defining an operation as a representation of interrelated primitives, each said primitive performing a single function and having a plurality of parameters which define a behavior of said function, the value of at least one of said parameters being user-assignable, and text descriptions defining said parameters and said function of said primitive;

creating a data structure of each primitive utilized in said user-created subscriber service diagram of said operation, each said data structure comprising a set of one or more nodes, with each node including data fields containing a description of a function of said primitive and a description of a parameter thereof;

examining said data structures for said primitives and determining text descriptions of said parameters and said functions of said primitives based upon said primitive parameter values assignable by the user; and providing said determined text descriptions of said parameters and said functions for said primitives into the user-created subscriber service diagram;

wherein said data structure for at least one primitive comprises a set of a plurality of nodes, each of said nodes including data fields containing a description of said function, a description of a parameter, and links to other of said nodes in said set of nodes for said primitive.

12. The method of claim 11, wherein:

said data field of said node which links said node to another node in said set of nodes for said primitive includes a data field specifying a value of said parameter whose value is user-assignable, and a data field containing a pointer to said another node for examining by said examining means if said user-assignable parameter value does not match said specified parameter value in said node having said pointer.

13. The method of claim 11, wherein:

said data field of said node which links said node to another node in said set of nodes for said primitive includes a data field specifying a value of said parameter whose value is user-assignable, and a data field containing a pointer to said another node for examining by said examining means if said user-assigned parameter value matches said specified parameter value in said node having said pointer.

14. The method of claim 11, wherein:

said determining step comprises the steps of creating a working node for each primitive, wherein each said working node has an identical structure to nodes corresponding to said primitive, examining nodes in said set of nodes, and writing data into data fields in each said working node based upon said value assigned to said parameter of said respective primitives by the user.

15. The method of claim 14, wherein:

said data structure for at least one first primitive includes a set of a plurality of nodes, each of said nodes in said data structure including data fields containing a description of said function, a description of a parameter and a condition for said parameter whose value is user-assignable for said first primitive; and said data writing step comprises the step of writing data from data fields of a node corresponding to said first primitive into said working node therefor based upon an affirmative determination that said parameter value assignable by the user matches said condition in said node.

16. The method of claim 15, wherein:

said data fields in said working nodes for said primitives contain said determined text descriptions of said parameters and said functions for said corresponding primitives following said examining and said determining of said data structure of said primitives; and said providing step comprises the step of porting said data fields of said working nodes into said user-created subscriber service diagram of said operation.

17. The method of claim 11, wherein:

one or more nodes of said data structure for at least one primitive includes a data field containing a constraint for a parameter of said at least one primitive.

18. The method of claim 17, wherein:

said determining step includes the step of determining said parameter constraint for said at least one primitive based upon said parameter value specified by the user; and said providing step includes the step of providing said determined parameter constraint into said user-created subscriber service database.

19. A method of creating an electronic database defining an operation, comprising the steps of:

receiving a user-created subscriber service diagram defining an operation as a representation of interrelated primitives, each said primitive performing a single function and having a plurality of parameters which define a behavior of said function, the value of at least one of said parameters being user-assignable, and text descriptions defining said parameters and said function of said primitive;

creating a data structure of each primitive utilized in said user-created subscriber service diagram of said operation, each said data structure comprising a set of one or more nodes, with each node including data fields containing a description of a function of said primitive and a description of a parameter thereof and one or more nodes of said data structure for at least one primitive including a data field containing a constraint for a parameter of said at least one primitive;

examining said data structures for said primitives and determining text descriptions of said parameters and said functions of said primitives based upon said primitive parameter values assignable by the user, said determining including determining said parameter constraint for said at least one primitive based upon said parameter value specified by the user;

providing said determined text descriptions of said parameters and said functions for said primitives into the user-created subscriber service diagram, and providing said determined parameter constraint into said user-created subscriber service diagram; and validating a parameter value corresponding to said determined parameter constraint against said determined parameter constraint.

20. A computer program product capable of being embodied on a computer readable medium, for a system for creating a subscriber service diagram database defining an operation and utilizing a library set of functional primitives having user-assignable parameters therefor, said computer program product including instructions for:

creating data structures from functional primitives in the subscriber service diagram database, each said data structure comprising a set of one or more nodes, with each node including data fields containing description data extracted from the subscriber service diagram database pertaining to a behavior of the corresponding functional primitive and a parameter therefor;

examining said created data structures and for determining text descriptions from said description data pertaining to said behavior of the corresponding functional primitive and a parameter therefor based upon values for the user-assignable parameters for the functional primitives;

providing said determined text descriptions into the subscriber service diagram database;

wherein at least one functional primitive includes a constraint upon a user-assignable parameter value for the functional primitive; and said product further includes instructions for validating the user-assignable parameter value against the parameter constraint corresponding thereto, and for providing validation information into said subscriber service diagram.

21. The product of claim 20, wherein:

the instructions for examining and determining includes instructions for creating a working data structure node for each functional primitive and for writing data into data fields in said working data structure node based upon the user-assignable parameter values.

22. A computing method for use in a system for creating a subscriber service diagram utilizing a library set of functional primitive building blocks having user-assignable parameters therefor, said method comprising the steps of:

creating data structures from the subscriber service diagram, each said data structure comprising a set of one or more nodes, with each node including data fields containing description data extracted from the subscriber service diagram pertaining to a behavior of a functional primitive building block and a parameter therefor;

examining said created data structures and determining text descriptions from said description data pertaining to said behavior of a functional primitive building block and a parameter therefor based upon values for the user-assignable parameters for the functional primitive building blocks;

automatically providing said determined text descriptions into the subscriber service diagram;

wherein at least one functional primitive building block includes a constraint upon a user-assignable parameter value for the functional primitive building block; and validating the user-assignable parameter value against the parameter constraint corresponding thereto, and providing validation information into said subscriber service diagram.

23. The method of claim 22, wherein:

said examining and determining step includes the steps of creating a working data structure node for each functional primitive building block in the subscriber service diagram and writing data into data fields in said working data structure node based upon the user-assignable parameter values.

* * * * *